United States Patent
Jacob (Yaakov)

(10) Patent No.: US 8,320,690 B2
(45) Date of Patent: Nov. 27, 2012

(54) SYSTEM, DATA STRUCTURE, AND METHOD FOR SIMULTANEOUSLY RETRIEVING MULTI-DIMENSIONAL DATA WITH ZERO CONTENTION

(75) Inventor: Jeffrey Allan (Alon) Jacob (Yaakov), Raanana (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 236 days.

(21) Appl. No.: 12/797,727

(22) Filed: Jun. 10, 2010

(65) Prior Publication Data
US 2011/0307459 A1    Dec. 15, 2011

(51) Int. Cl.
*G06K 9/36* (2006.01)
(52) U.S. Cl. ...................................................... 382/233
(58) Field of Classification Search .................. None
See application file for complete search history.

(56) References Cited

U.S. PATENT DOCUMENTS

| | | | |
|---|---|---|---|
| 6,028,807 A | 2/2000 | Awsienko | |
| 2009/0016450 A1 | 1/2009 | Wang et al. | |
| 2011/0157194 A1* | 6/2011 | Eisenbach et al. | 345/522 |

OTHER PUBLICATIONS

Jian-Ying Peng et al. "A Parallel Memory Architecture for Video Coding" Journal of Zhejiang University—Science A vol. 9, No. 12, pp. 1644-1655. Dec. 9, 2008.

Lingfeng Li et al: "An Efficient Deblocking Filter Architecture With 2-Dimensional Parallel Memory for H.264/AVC", Design Automation Conference, 2005. Proceedings of the ASP-DAC 2005. A SIA and South Pacific Shanghai, China Jan. 18-21, 2005, Piscataway, NJ, USA,IEEE, vol. 1, pp. 623-626, Jan. 18, 2005.

Kuusilinna K et al: "Configurable Parallel Memory Architecture for Multimedia Computers", Journal of Systems Architecture, Elsevier BV, NL, vol. 47, No. 14-15, pp. 1089-1115, Aug. 1, 2002.

* cited by examiner

*Primary Examiner* — Claire X Wang
(74) *Attorney, Agent, or Firm* — Pearl Cohen Zedek Latzer, LLP

(57) ABSTRACT

A system, processor, and method for processing multiple dimension data. A single rectangular data array having a single data port may store a set of data elements representing a multi-dimensional pixel array. A load/store unit may receive the set of data elements and store them divided among a plurality of individually addressable data arrays each having separate address ports. Each individually addressable data array may include at most a single row that stores data elements from a sub-set of the set of data elements representing a multi-dimensional sub-array of the pixel array. A processor may simultaneously access the single row of each of the plurality of individually addressable data arrays by accessing the corresponding respective address ports for each individually addressable data array to retrieve the complete sub-set of data elements in a single computational cycle. An execution unit may execute instruction(s) on the sub-set of data elements.

20 Claims, 4 Drawing Sheets

| Address | Row number | Bank 0 | Bank 1 | Bank 2 | Bank 3 | Bank 4 | Bank 5 | Bank 6 | Bank 7 |
|---|---|---|---|---|---|---|---|---|---|
| x00-x1F | 0 | 0 1 2 3 | 4 5 6 7 | 8 9 10 11 | 12 13 14 15 | 16 17 18 19 | 20 21 22 23 | 24 25 26 27 | 28 29 30 31 |
| x20-x3F | 1 | 32 33 34 35 | 36 37 38 39 | 40 41 42 43 | 44 45 46 47 | 48 49 50 51 | 52 53 54 55 | 56 57 58 59 | 60 61 62 63 |
| x40-x5F | 2 | X X X X | X X X X | 0 1 2 3 | 4 5 6 7 | 8 9 10 11 | 12 13 14 15 | 16 17 18 19 | 20 21 22 23 |
| x60-x7F | 3 | 24 25 26 27 | 28 29 30 31 | 32 33 34 35 | 36 37 38 39 | 40 41 42 43 | 44 45 46 47 | 48 49 50 51 | 52 53 54 55 |
| x80-x9F | 4 | 56 57 58 59 | 60 61 62 63 | X X X X | X X X X | 0 1 2 3 | 4 5 6 7 | 8 9 10 11 | 12 13 14 15 |
| xA0-xBF | 5 | 16 17 18 19 | 20 21 22 23 | 24 25 26 27 | 28 29 30 31 | 32 33 34 35 | 36 37 38 39 | 40 41 42 43 | 44 45 46 47 |
| xC0-xDF | 6 | 48 49 50 51 | 52 53 54 55 | 56 57 58 59 | 60 61 62 63 | X X X X | X X X X | 0 1 2 3 | 4 5 6 7 |
| xE0-xFF | 7 | 8 9 10 11 | 12 13 14 15 | 16 17 18 19 | 20 21 22 23 | 24 25 26 27 | 28 29 30 31 | 32 33 34 35 | 36 37 38 39 |
| x100-x11F | 8 | 40 41 42 43 | 44 45 46 47 | 48 49 50 51 | 52 53 54 55 | 56 57 58 59 | 60 61 62 63 | X X X X | X X X X |
| x120-x13F | 9 | 0 1 2 3 | 4 5 6 7 | 8 9 10 11 | 12 13 14 15 | 16 17 18 19 | 20 21 22 23 | 24 25 26 27 | 28 29 30 31 |
| x7FE0-x7FFF | 511 | ... | ... | ... | ... | ... | ... | ... | ... |

FIG. 3

SYSTEM, DATA STRUCTURE, AND METHOD FOR SIMULTANEOUSLY RETRIEVING MULTI-DIMENSIONAL DATA WITH ZERO CONTENTION

BACKGROUND OF THE INVENTION

The present invention relates to video and image applications, and more particularly to a method for simultaneously processing multiple dimensional data, for example, in video and imaging applications.

Video and imaging applications may process data from a computer memory. The video and imaging data may be stored in a multi-dimensional data array. Each data element in the multi-dimensional data array may have a value uniquely associated with a pixel in an image or video frame. The multi-dimensional data array may be divided into blocks or sub-arrays, each spanning multiple rows and columns. The data elements in each sub-array may be related, correlated, or co-dependent such that instructions in a program may be executed on all the data elements together, as a group, according to conventional video processing mechanisms.

Processors may retrieve video or image data from the computer memory in bursts, bundles or groups of data elements. A burst may include multiple data elements which are sequentially ordered in a single row of the multi-dimensional data array. For example, a burst of 4, 8, or 16, data elements sequentially listed in a single row of the multi-dimensional data array may be retrieved in each load operation. Since data elements are sequentially retrieved, row by row, the burst or group of retrieved data elements (sequentially listed in a single row) often do not correspond to the group of correlated data elements (spanning multiple rows of a sub-array). Accordingly, to retrieve all the data in each sub-array to be processed together, a processor may cycle through multiple load operations for each row of the sub-array to obtain the entire group of data in the multi-dimensional array.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

FIG. 3 is a schematic illustration of a data structure for storing video and image data in accordance with embodiments of the invention.

Figure 1:
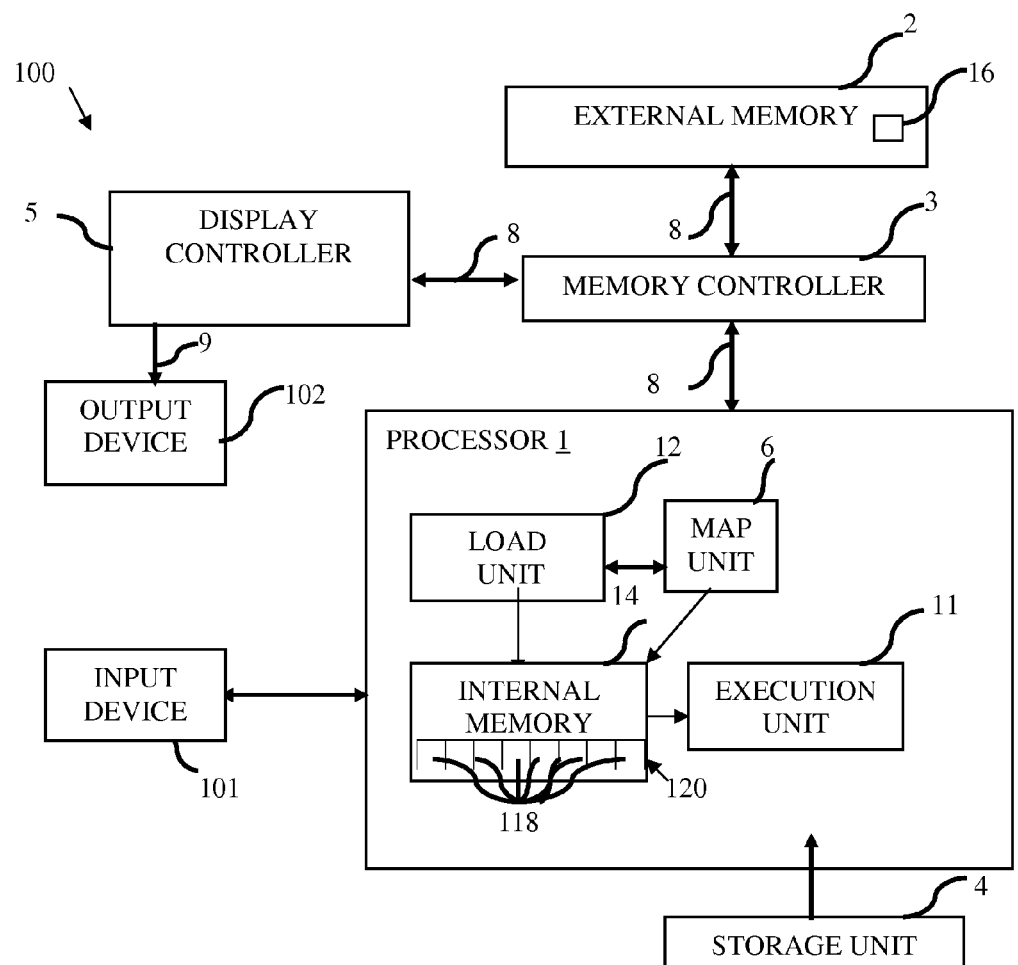
FIG. 1 is a schematic illustration of a system in accordance with embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In conventional systems, a digital image may have a multi-dimensional grid or array of pixels, which may be represented by a corresponding multi-dimensional array of data elements stored in a computer memory, where each data element uniquely corresponds to a pixel. To reduce computational overhead, a data array may have a single address port. A processor may typically only retrieve data elements from a single data array row via each address port in each computational cycle. The processor, however, may execute instructions, not on a single row, but on a multi-dimensional sub-array of the data array. Since the elements of a multi-dimensional sub-array span multiple rows, a conventional processor may use a separate computational cycle to retrieve each row of data, thereby using multiple computational cycles to retrieve all of the elements of the multi-dimensional sub-array.

Embodiments of the invention are directed to an improved memory structure to enable all elements of a multi-dimensional sub-array to be retrieved in a single computational cycle.

According to some embodiments of the invention, a memory unit is provided, for example, internal to the processor, having a plurality of individually accessible and/or addressable memory sub-units. The correlated data elements from a multi-dimensional sub-array, conventionally stored in a single memory unit, may be spread out or divided among the plurality of individually addressable memory sub-units so that each row is stored in a different memory sub-unit. Since each row of the multi-dimensional sub-array is independently stored in a different memory sub-unit and each memory sub-unit is independently accessible via a different respective address port, a processor may simultaneously access all rows corresponding to the multi-dimensional sub-array in a single computational cycle.

Reference is made to FIG. 1, which is schematic illustration of an exemplary device according to embodiments of the invention.

Device 100 may include a computer device, video or image capture or playback device, cellular device, or any other digital device such as a cellular telephone, personal digital assistant (PDA), video game console, etc. Device 100 may include any device capable of executing a series of instructions to record, save, store, process, edit, display, project, receive, transfer, or otherwise use or manipulate video or image data. Device 100 may include an input device 101. When device 100 includes recording capabilities, input device 101 may include an imaging device such as a camcorder including an imager, one or more lens(es), prisms, or mirrors, etc. to capture images of physical objects via the reflection of light waves therefrom and/or an audio recording device including an audio recorder, a microphone, etc., to record the projection of sound waves thereto.

When device 100 includes image processing capabilities, input device 101 may include a pointing device, click-wheel or mouse, keys, touch screen, recorder/microphone using voice recognition, other input components for a user to control, modify, or select from video or image processing operations. Device 100 may include an output device 102 (for example, a monitor, projector, screen, printer, or display) for displaying video or image data on a user interface according to a sequence of instructions executed by processor 1.

An exemplary device 100 may include a processor 1. Processor 1 may include a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 100 may include an external memory unit 2 and a memory controller 3. Memory controller 3 may control the transfer of data into and out of processor 1, external memory unit 2, and output device 102, for example via one or more data buses 8. Device 100 may include a display controller 5 to control the transfer of data displayed on output device 102 for example via one or more data buses 9.

Device 100 may include a storage unit 4. Storage unit 4 may store video or image data in a compressed form, while external memory unit 2 may store video or image data in an uncompressed form; however, either compressed or uncompressed data may be stored in either memory unit and other arrangements for storing data in a memory or memories may be used. Each uncompressed data element may have a value uniquely associated with a single pixel in an image or video frame, while each compressed data element may represent a variation or change between the value(s) of a pixel within a frame or between consecutive frames in a video stream or moving image. When used herein, unless stated otherwise, a data element generally refers to an uncompressed data element, for example, relating to a single pixel value or pixel component value (for example, a YUV or RGB value) in a single image frame, and not a compressed data element, for example, relating to a change between values for a pixel in consecutive image frames. Uncompressed data for an array of pixels may be represented in a corresponding multi-dimensional data array (for example, as in FIG. 2) or in a plurality multi-dimensional data arrays (for example, as in FIG. 3), while compressed data may be represented as a data stream or one-dimensional (1D) data array (not shown).

Internal memory unit 14 may be a memory unit directly accessible to or internal to (physically attached or stored within) processor 1. Internal memory unit 14 may be a short-term memory unit, external memory unit 2 may be a long-term or short-term memory unit, and storage unit 4 may be a long-term memory unit; however, any of these memories may be long-term or short-term memory units. Storage unit 4 may include one or more external drivers, such as, for example, a disk or tape drive or a memory in an external device such as the video, audio, and/or image recorder. Internal memory unit 14, external memory unit 2, and storage unit 4 may include, for example, random access memory (RAM), dynamic RAM (DRAM), flash memory, cache memory, volatile memory, non-volatile memory or other suitable memory units or storage units. Internal memory unit 14, external memory unit 2, and storage unit 4 may be implemented as separate (for example, "off-chip") or integrated (for example, "on-chip") memory units. In some embodiments in which there is a multi-level memory or a memory hierarchy, storage unit 4 and external memory unit 2 may be off-chip and internal memory unit 14 may be on-chip. For example, internal memory unit 14 may include a tightly-coupled memory (TCM), a buffer, or a cache, such as, an L-1 cache or an L-2 cache. An L-1 cache may be relatively more integrated with processor 1 than an L-2 cache and may run at the processor clock rate whereas an L-2 cache may be relatively less integrated with processor 1 than the L-1 cache and may run at a different rate than the processor clock rate. In one embodiment, processor 1 may use a direct memory access (DMA) unit to read, write, and/or transfer data to and from memory units, such as external memory unit 2, internal memory unit 14, and/or storage unit 4. Other or additional memory architectures may be used.

Processor 1 may include a load unit 12, a mapping unit 6, and an execution unit 11. Processor 1 may request, retrieve, and process data from external memory unit 2, internal memory unit 14, and/or storage unit 4 and may control, in general, the pipeline flow of operations executed on the data.

In each load operation or computational cycle, load unit 12 may retrieve or fetch a set or "burst" of sequential data elements from a single row of a data structure (for example, multi-dimensional data array 200 of FIG. 2) and may load and store this data into internal memory or registers. If load unit 12 attempts to access two or more rows of a data structure with a single address port in a single cycle, load unit 12 may experience "data contention," in which only one row may be retrieved in the current cycle, and access to each remaining row is delayed until another cycle.

In alternative embodiments, instead of retrieving data elements from a single row, load unit 12 may retrieve sequential data elements from a single column (or diagonally across or in another pre-determined pattern) of the data structures in external memory unit 2 in each load operation.

Processor 1 may write the loaded data in an internal memory 14, such as, for example, a buffer, TCM, or cache. Processor 1 may only execute instructions on the data elements once a complete set of correlated data elements spanning multiple rows of a multi-dimensional sub-array are stored in internal memory 14.

Once a complete set of correlated data elements are loaded and stored in internal memory 14, processor 1 may dispatch and decode instructions on the set of data and then execution unit 11 may execute these instructions. The instructions may be stored in a program memory (for example, in external memory unit 2 and/or storage unit 4) and may be applied to complete sets of correlated video or image data, for example, in sequence, according to the specifications of a computer program. Processor 1 may execute, for example, the following exemplary sequential pipeline stages for each instruction.

To execute each instruction for multi-dimensional video or image data, processor 1 may process each data element in one of the multiple dimensions together with correlated data elements in the other of the multiple dimensions. When a correlated data set is defined by multiple dimensions, all coordinates of the multiple dimensions are processed together as a group, according to any suitable video processing mechanisms, to generate complete or accurate data. Just as a point location in Cartesian space (xyz) may be defined by values in (x), (y), and (z) together and not just (x) alone, a piece of multi-dimensional video or image data may be defined by all correlated multi-dimensional data elements.

Video or image data may be stored in multi-dimensional data structures. The multi-dimensional data structures may include a plurality of multi-dimensional sub-arrays each of which uniquely corresponds to a distinct set of correlated data elements or the pixels associated therewith. The correlated data elements in each sub-array may span multiple rows and columns of the multi-dimensional data array.

Figure 2:
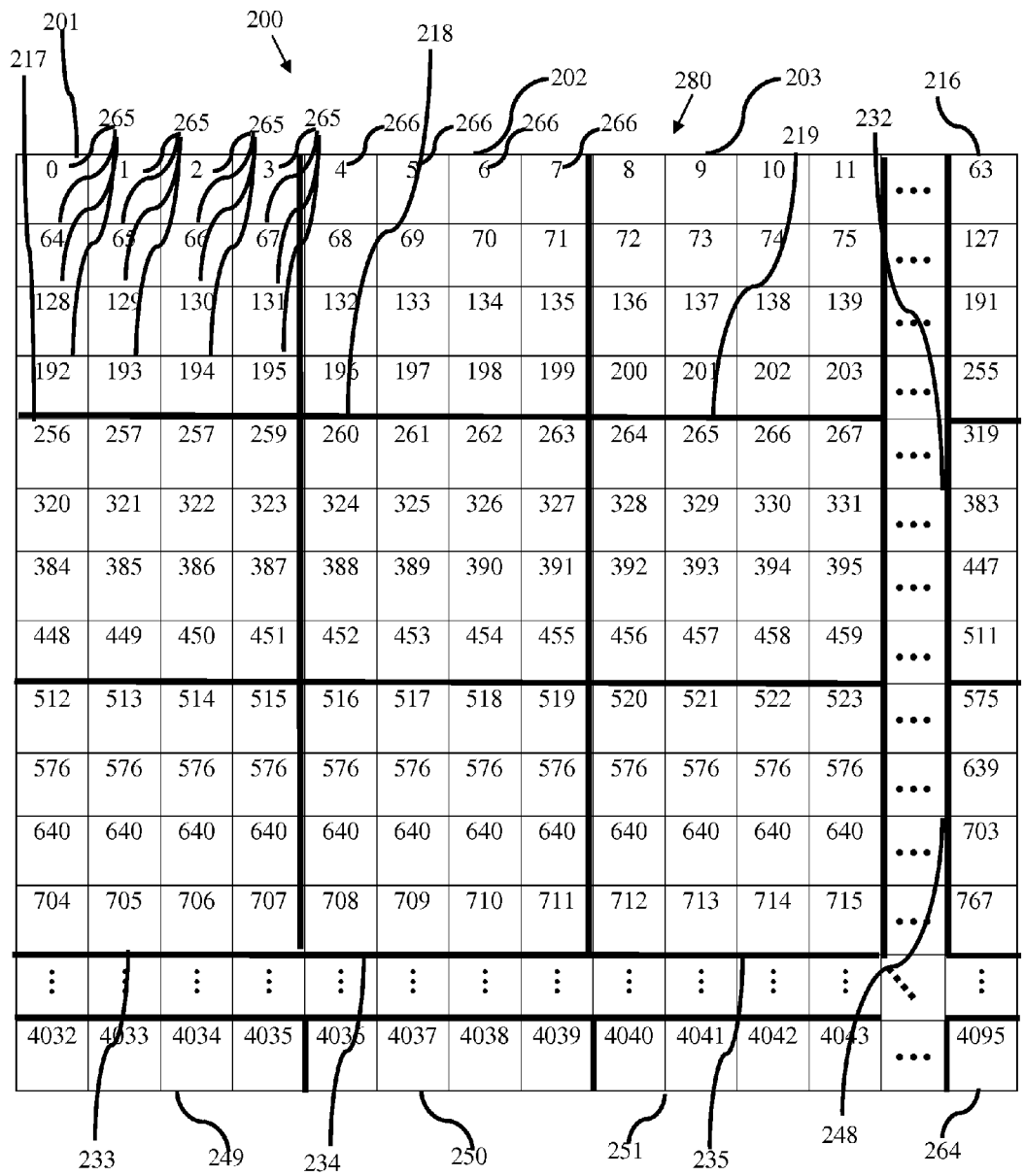
FIG. 2 is a multiple dimensional data array for storing video and imaging data helpful in understanding embodiments of the invention.

Reference is made to FIG. 2, which schematically represents a two dimensional (2D) data array 200 for storing video and imaging data helpful in understanding embodiments of the invention. The two dimensional (2D) data array 200 may include a plurality of blocks or sub-arrays 201-264, for example, each including a distinct set of correlated data elements. For example, all correlated data elements 265 in sub-array 201 may be retrieved from memory and may be processed together. In the example shown in FIG. 2, data array 200 is a (64×64) data array (corresponding to a 64×64 pixel grid) having (256) sub-arrays 201-264, each sub-array being a (4×4) sub-array having (16) correlated data elements.

To retrieve the (16) correlated data elements 265 in sub-array 201, a processor may execute multiple operation cycles to separately load data elements 265 in each respective row of the multi-row sub-array 201. For example, the processor may retrieve data elements 265 from each of the (4) rows of each (4×4) sub-array 201-264 in FIG. 2, one row at a time, in different respective load cycles. Accordingly, to retrieve all of the (16) correlated data elements 265 in the (4) rows of the (4×4) sub-array 201, the processor may access the data memory in (4) separate bursts in (4) separate computational cycles.

Since only the first (4) sequential data elements 265 in each row of sub-array 201 are correlated, increasing the number of data elements in each burst, for example, to be greater than (4) such as to (8) or (16), will cause such a processor to retrieve data elements 266 further along in each row (for example, inside the sub-array 202) which are not correlated with the first (4) data elements 265. Accordingly, when using a conventional processor, increasing the burst size will not affect the number of computational cycles needed to retrieve the (16) correlated data elements 265, which in this example, will be the same (for example, 4 cycles) regardless of the number of data elements retrieved in each burst.

Embodiments of the invention are directed to an internal and/or external memory data structure that enables all correlated data elements of each (for example, 4×4) sub-array 201-209 to be retrieved in a single computational cycle. Retrieving data may refer to either loading or storing the data. Embodiments of the invention may include transforming data elements from data array 200 of FIG. 2 to data structure 300 of FIG. 3. Data array 200 of FIG. 2 may have a single memory port, while data structure 300 of FIG. 3 may have a plurality of data ports, one port to individually access each of a plurality of data arrays within data structure 300. Data array 200 of FIG. 2 may be stored in a memory sub-unit 16 (having a single address port) in external memory unit 2 of FIG. 1 and data array 300 of FIG. 3 may be stored in a plurality of memory banks or memory sub-units 118 (each having a different respective address port) in memory unit 120 in internal memory unit 14 of FIG. 1; however, either data array 200 of FIG. 2 or data structure 300 of FIG. 3 may be stored in any of internal memory unit 14, external memory unit 2, and/or storage unit 4.

Reference is made to FIG. 3, which schematically illustrates data structure 300 for storing video and image data, according to some embodiments of the invention. Data structure 300 may include a plurality of individually accessible and/or addressable data arrays 301-308. The correlated data elements of a multi-dimensional sub-array (for example, correlated data elements 265 in sub-array 201 of FIG. 2) may be spread out or divided among the plurality of individually addressable data arrays 301-308 to eliminate data contention so that all the data elements may be accessed simultaneously, i.e., in a single computational cycle.

Since a single load unit of a processor may only load data elements from a single row of each individually addressable data structure in a single computational cycle, embodiments of the invention may separate the rows of a multi-row sub-array into a plurality of different individually addressable data arrays 301-308.

To ensure that no elements from the same sub-array are in two different rows of any one of individually addressable data arrays 301-308, data structure 300 may stagger elements. In one embodiment, each of (n) stacked rows of an (n×m) sub-array may be vertically staggered so that each of the (n) stacked row are independently stored in a different one or more individually addressable data arrays 301-308 and so that no two rows of the same individually addressable data array 301-308 stores data from the same sub-array. Accordingly, each individually addressable data array 301-308 has at most one row of a set of correlated data elements from each sub-array. Since a processor may independently access a single row of each individually addressable data array 301-308, and the correlated data elements are stored in at most a single row of each individually addressable data array 301-308, the processor may simultaneously retrieve all correlated data elements corresponding to all rows of the multi-row data array in a single computational cycle.

To transform data elements from the single data array 200 of FIG. 2 to the plurality of individually addressable data arrays 301-308 of FIG. 3, according to embodiments of the invention, the data elements may both be divided among the plurality of individually addressable data arrays 301-308 and staggered therewithin. In one embodiment, a mapping unit 6 may transform the data elements. In another embodiment, the individually addressable data arrays 301-308 of FIG. 3 may have a sequence of address ports with addresses, where the addresses of the address ports are themselves ordered. In such embodiments, the addresses of the address ports may be ordered according to the order in which the data elements are to be transferred. For example, the first individually addressable data array 301 may have a first address, the second individually addressable data array 302 may have a second address, and so on. Accordingly, processor 1 may automatically transform the data elements from data array 200 of FIG. 2 according to the sequential addresses of individually addressable data arrays 301-308 of FIG. 3 and no separate mapping unit is needed (although a mapping unit may be used).

To divide data elements from a single data array having a single address (for example, data array 200 or FIG. 2) among the individually addressable data arrays 301-308, in one embodiment, a processor may transfer data elements from the data array in the order in which they are sequentially listed in each row of the data array, one row at a time, in order of the sequence of rows, to fill up the first (top-most) available row of all of individually addressable data arrays 301-308, and then the next available rows, and so on. That is, each ($n^{th}$) row of data elements in a multi-dimensional data array or grid may be divided into a plurality of ($n^{th}$ and/or $n+1^{th}$) rows, the plurality of rows spread out or lined up side-by-side, in the respective individually addressable data arrays 301-308. In general, the processor may order data elements, $a_{ij}$, $1 \leq i \leq M$, $1 \leq j \leq N$, in an (N×M) data array 200, in the order in which the elements are sequentially listed in each row (for example, left-to-right) in sequential order of the rows (for example, top-to-bottom), as $a_{11} \ldots a_{1N}$, $a_{21}, \ldots, a_{2N}$, $a_{31}, \ldots$, $a_{3N}, \ldots, a_{M1}, \ldots, a_{MN}$. The processor may store the sequence of data elements, in order, in a plurality of (P×Q) individually addressable data arrays 301-308, for example, filling up the first available row $1 \leq k \leq P$ of all the data arrays 301-308, in order of the data arrays 301-308, before proceeding to the next available row $1 \leq k+1 \leq P$ of the data arrays 301-308.

After the data elements from the (n) rows of the data array that span the (n) rows of top-most sub-arrays 201-216, the next (n) rows of the data array spanning the next sub-array are transformed, and so on. This pattern may continue until all sub-arrays 201-264 in FIG. 2 are transformed to their corresponding positions in individually addressable data arrays 301-308 of FIG. 3.

However, simply transforming the sequence of data elements from a single data array 200 to a plurality of individually addressable data arrays 301-308 may not eliminate data contention between correlated elements. Correlated elements which are stacked (for example, vertically aligned) in multiple rows of a sub-array in FIG. 2 may still be stacked in the multiple rows of individually addressable data arrays 301-308 in FIG. 3 (for example, stacked directly on top of each other or with other rows therebetween). When correlated element are stacked in data arrays 301-308, since a processor cannot access multiple rows of the same data array in a single computational cycle, the processor may experience data contention and be forced to retrieve the full set of all correlated data elements in more than one computational cycle.

To eliminate data contention and to retrieve all correlated data elements in a single cycle, embodiments of the invention may ensure that the processor transforms data elements so that no correlated data elements from the same sub-array 201-264 in FIG. 2 are stored in more than one row of any single data array 301-308. For example, each data array 301-308 may have at most a single row that stores correlated data elements from each sub-array 201-264, such as, the (16) correlated data elements 8-11, 72-75, 136-139, and 200-203, from sub-array 203. To ensure this, the processor may stagger correlated data elements. In one embodiment, the processor may insert a sequence of "place-holder" or "null" data elements in data arrays 301-308, for example, in between sequences of data elements from respective rows of data array 200. By inserting null data elements, correlated data elements which were vertically aligned in the original data array 200 may be staggered when transformed into different data arrays 301-308 thereby eliminating data contention.

In one embodiment, staggering the correlated data elements may transform the data elements from an (N×M) data array 200 spanning an (n×m) sub-array 201 to data structure 300 so that each individually addressable data array 301-308 has at most one row (or part of one row) storing the correlated data elements from any single (n×m) sub-array 201-264. In another embodiment, each individually addressable data array 301-308 may store at most one element from each column of each sub-array 201-264. For example, each individually addressable data array 301-308 may store at most one element (0, 64, 128, or 192) from the first column of the first sub-array 201, at most one element (1, 65, 129, or 193) from the second column of the first sub-array 201, and so on for all sub-arrays 201-264. Accordingly, each individually addressable data array 301-308 may store at most one element from each of the (64) columns of each (4×64) portion of the (64×64) 200, for example, where the first (4×64) data array portion corresponds to sub-arrays 201-216, the next portion corresponds to sub-arrays 217-232, then sub-arrays 233-248, and sub-arrays 249-264.

In the example in FIG. 3, a processor may transform a (64×64) data array (corresponding to a (64×64) pixel region of an image) into (8) individually addressable data arrays 301-308 each of which are 4-pixel columns wide. The processor may transform the first (32) data elements from the first (1×64) row of data array 200 to fill up all the first rows of all (8) individually addressable data arrays 301-308, and then, if there are remaining data elements in the first row of data array 200 (in this case there are 32 remaining elements), the processor may proceed to fill up the next (second) row of all data arrays 301-308, and so on. In between the (64) data elements from each (1×64) row of the data array, the processor may store null data elements (labeled "X" in FIG. 3). The processor may store an integer number of null data elements that staggers correlated data elements to eliminate data contention in data arrays 301-308, which may vary according to the dimensions of data structure 300. In the example in FIG. 3, the processor stores (8) null data elements, although other numbers may be used. These null data elements stagger the correlated data elements of a (4×4) sub-array in a (64×64) data array so that each addressable data array 301-308 has no more than one row of correlated data elements from each (4×4) sub-array and at most one data element (1, 2, . . . , 64) from each column (1)-(64) of the data array portion (4×64) spanning the (4) rows of the sub-array.

In contrast with FIG. 2, in which a set of correlated data elements span multiple rows of a single data structure 200 having single address port, in FIG. 3, the same set of correlated data elements span at most a single row of each individually addressable data array 301-308.

In an example described in reference to FIG. 2, since the 2D data array 200 has a single address port, a processor may only retrieve data from one row at a time. Accordingly, the processor may retrieve a 2D (4×4) sub-array of correlated data in (4) separate load cycles. For example, burst 1 may include elements (6)-(9) of row 1, burst 2 may include elements (70)-(73) of row 2, burst 3 may include elements (134)-(137) of row 3, and burst 4 may include elements (198)-(201) of row 4.

In an example described in reference to FIG. 3, each set of (16) correlated data elements from the (4) stacked rows and (4) consecutive columns of the (4×4) sub-array of FIG. 2 (corresponding to a 4×4 pixel array) is arranged in (8) individually addressable data arrays 301-308, where at most a single row of each data array 301-308 has the correlated data elements. Since each data array 301-308 is individually addressable, the processor may simultaneously access a data burst from the single correlated row of each data array 301-308 to retrieve all (4) rows of the (4×4) sub-array (e.g., highlighted sub-array 280 of FIG. 2) in a single computational cycle. For example, the processor may simultaneously retrieve data elements (6)-(9) corresponding to a first row of a (4×4) sub-array from row 1 of both data arrays 302 and 303, data elements (6)-(9) corresponding to the second row of the (4×4) sub-array from row 3 of both data arrays 304 and 305, data elements (6)-(9) corresponding to the third row of the (4×4) sub-array from row 5 of both data arrays 306 and 307, data elements (6)-(7) corresponding to the fourth row of the (4×4) sub-array from row 7 of data array 308, and data elements (8)-(9) corresponding to the fourth row of the (4×4) sub-array from row 8 of data array 301.

In contrast with the (4) separate load cycles used to retrieve data elements of a (4×4) sub-array from the data structure 200 of FIG. 2 via a single address port, a single (1) computational cycle is used to retrieve the same elements from the data structure 300 of FIG. 3 via a plurality of address ports. Accordingly, embodiments of the invention may provide a four-fold increase in the efficiency for retrieving a correlated set of video and image data, for example, used to process an instruction.

In some embodiments, if correlated data elements are stored in rows which coincide with the rows of the individually addressable data arrays 301-308 (for example, such as data elements (4)-(7)), the processor may retrieve the correlated data elements from a subset (4) of data arrays 301-308. For example, the processor may retrieve correlated data elements (4)-(7) from data arrays 302, 304, 306, and 308, and need not access the remaining data arrays 301, 303, 305, and 307. This allows improved efficiency of the data memory, resulting in better performance and lower power consumption. Furthermore, if two distinct correlated data sets both coincide with different respective subsets of individually addressable data arrays 301-308, the processor may simultaneously retrieve both sets of correlated data elements in a single computational cycle. For example, the processor may access data arrays 301, 303, 305, and 307 to retrieve the (4) rows of correlated data elements (8)-(11) and 302, 304, 306, and 308 to retrieve the (4) rows of correlated data elements (4)-(7), thereby retrieving elements from two (4×4) pixel sub-arrays in a single computational cycle. In this example, since a conventional processor used (4) cycles to load (4×4) sub-array and therefore (8) cycles to load two such sub-arrays, embodiments of the invention, which may retrieve the correlated data from the two sub-arrays in one (1) cycle, may provide an eight-fold increase in efficiency.

The correlated rows in each individually addressable data array 301-308 may be organized according to a pattern. Each pair of data elements, which were vertically aligned and adjacent (one on top of the other) in the data array 200 of FIG. 2, is transformed in a string of data elements separated by the number of elements in a row of the data structure plus the number of null data elements inserted therebetween. In the example shown in FIG. 3, transformed from a (64×64) data array, each row has (64) elements and (8) null elements are used. Accordingly, each pair of vertically aligned and adjacent data elements in the data array 200 of FIG. 2 are transformed to data array 301-308 to predetermined positions, which are (64)+(8)=(72) data elements apart, counting in the order in which the elements were stored (for example, across all aligned rows of all data arrays 301-308 before proceeding to the next set of rows). The "distance" or number of data elements between a pair of previously aligned and adjacent data elements may be referred to as the "stride" or separation of vertically adjacent elements. In the example in FIG. 3, a constant stride of (72) is used; however the stride may be constant or variable and may be any other number, for example, depending on the number of data elements or pixels in a region and/or the number of null data elements used. To retrieve a set of correlated data (for example, spanning a rectangle sub-array from which they were transformed), the processor may automatically access rows of the individually addressable data arrays 301-308 which are separated by a stride, for example, of (72) data elements.

It may be appreciated that although embodiments of the invention are described in reference to correlated data in a 2D data array corresponding to the same (4×4) sub-array, any rectangular sub-array may be used, for example, (4×8), (8×4), (8×8), (4×16), (16×16), etc. Furthermore, it may be appreciated that higher dimensional, for example, three-dimensional (3D) data arrays may be used, which may be represented by a 3D matrix or tensor data structure. In one example, LUMA data elements may be represented in a 2D data array, while Chroma data elements are represented in a 2D or 3D data array.

For a 3D data array divided into (4×4×4) sub-arrays of (64) correlated data elements, a processor may transform each 3D (64×64×64) data array into (4) sequential 2D (64×64) data arrays and then each 2D (64×64) data array into a plurality of (8) individually addressable data arrays, for example, as described above in reference to FIGS. 2 and 3. Accordingly, the correlated data elements from each (4×4×4) sub-array may be stored in (32) individually addressable data arrays. To retrieve the (64) correlated data elements from the (32) data arrays, the processor may simultaneously access a single row of each data array, retrieving all correlated data elements, using a different respective address for each data array row.

In contrast, a conventional non-efficient processor may retrieve data elements from a single row of a single (4×4) sub-array of the (4×4×4) sub-array in each load cycle (not simultaneously from 32 individually addressable data arrays in accordance with embodiments of the invention). Such a processor would use (16) separate consecutive load cycles to access (16) different rows in order to retrieve the (64) elements, which is a significant increase in computational cycles compared with the single cycle used to retrieve the same data in accordance with embodiments of the invention.

Other or different dimensions, rows, columns, arrays or sub-arrays, numbers of correlated elements, numbers of null data elements, numbers of elements in a sub-array, numbers of individually addressable data arrays 301-308 or memory banks, burst size, and load or clock cycles may be used.

In some embodiments, the processor may store data elements in individually addressable data arrays 301-308 in both an internal and external memory (for example, internal and external memory units 14 and 2 of FIG. 1). In other embodiments, the processor may initially store data elements in the data array 200 of FIG. 2 in the external memory and the processor may re-order, map, transform, sequence, spread-out or otherwise rearrange the data elements into the individually addressable data arrays 301-308 of FIG. 3 in the internal memory so that the processor may directly retrieve a correlated data set in one load cycle.

Figure 4:
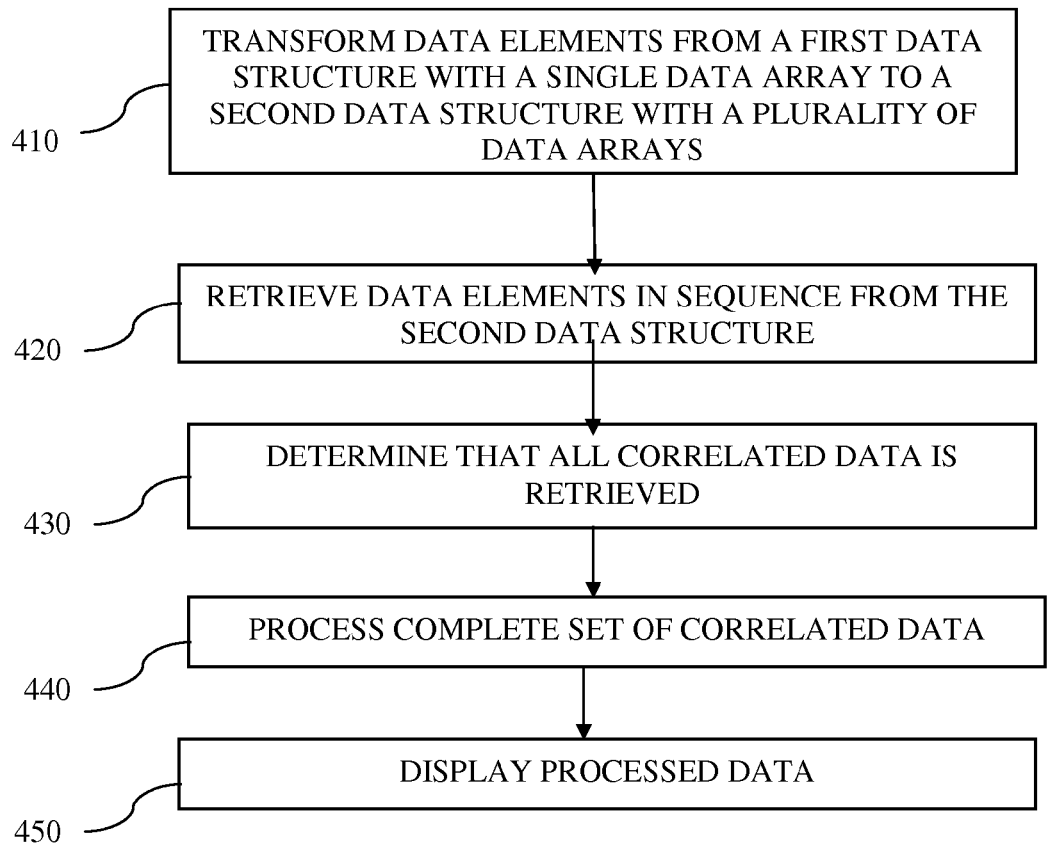
FIG. 4 is a flowchart of a method in accordance with embodiments of the invention.

Reference is made to FIG. 4, which is a flowchart of a method according to embodiments of the invention.

In operation 410, a processor (for example, processor 1 of FIG. 1) may transform data elements from a first data structure (for example, single data array 200 of FIG. 2) to a second data structure (for example, data structure 300 including the plurality of individually addressable data arrays 301-308 of FIG. 3). The first data structure may have a single address port, while the second data structure may include a plurality of data arrays, each having a separate address port for individually accessing each of the plurality of data arrays.

The processor may generate a string of the data elements from the first data structure to be transformed, for example, in a sequence of data bursts, to the second data structure. The string of data elements may be ordered, for example, according to the order in which they are sequentially listed in each row of the first data structure, one row at a time, in order of the sequence of rows. The processor may insert a sequence of null data elements in between data elements from different rows of the first data structure. The processor may transform the string of data elements, for example, by filling up the first (top-most) available row of all of the data arrays of the second data structure, in order of the sequence of data arrays, and then filling the next available rows, and so on. Such a transformation may divide a single row of the first data structure into a plurality of aligned rows in respective data arrays of the second data structure. Inserting the null data elements in between elements from consecutive rows of the first data structure may cause data elements which were originally vertically aligned (one on top of or overlapping another) in the first data structure to be vertically askew, not overlapping, or staggered into different data arrays of the second data structure.

A set of correlated data elements may include a sub-set of the first data structure that span a plurality of vertically stacked rows (for example, (4) stacked rows of a (4×4) sub-array). The processor may transform each correlated row, which was vertically stacked in the first data structure, to be vertically staggered or spread out into different respective data arrays of the second data structure. In one embodiment, each correlated data set, which spans multiple stacked rows of the first data structure, may span at most a single row of each data array of the second data structure.

In operation 420, once the data elements are transformed into the second data structure, the processor may retrieve a set of correlated data elements therefrom. Since each data array of the second data structure is individually accessible via a different address port, the processor may simultaneously access a data burst from the single correlated row of each data array to retrieve all (16) elements of the correlated data set in a single computational cycle. The processor may automatically access rows of the data arrays which are separated by a stride of data elements.

In contrast with the first data structure, since the first data structure only has a single address port (for accessing a single row of data at a time) and the correlated data set spans (4) stacked rows, the processor may retrieve the correlated data set in (4) separate computational cycles. Accordingly, retrieving a correlated data set from the second data structure may be four times faster than retrieving the same correlated data set from the first data structure.

In operation 430, the processor may determine that all correlated data elements, for example, transformed from a single sub-array of the first data structure, have been retrieved from the second data structure. Accordingly, the data set of correlated data is complete and may be properly processed.

In operation 440, the processor may process, for example, execute instructions on, the complete correlated data set of operation 430.

In operation 450, a display (for example, output device 102 of FIG. 1) may display the correlated data processed in operation 440. Other operations or series of operations may be used.

It should be appreciated by a person skilled in the art that although embodiments of the invention are described in reference to video or image data that any data having the same or similar digital structure but pertaining to different data types may be used. A similar digital structure may include data having sets of correlated or co-dependent values, sets that mutually or in combination describe the same data, or sets of individual dimension components of multi-dimensional data.

It should be appreciated by a person skilled in the art that although embodiments of the invention describing a systems, data structures, and methods for arranging, ordering or transforming data elements from one data array with one address to a plurality of data arrays with a plurality of addresses, in other embodiments of the invention the original data structure may equivalently be assigned a plurality of address ports, for example, without actually moving or re-positioning the data elements themselves.

It may be appreciated that increasing the number of address ports may increase processor overhead, for example, taking up computational power to manage the ports. Accordingly, address ports may preferably be added only when the advantage of adding the port outweighs the disadvantage of the increased overhead associated therewith. In one example, some data structures use a single port per data array as shown in FIG. 2. Embodiments of the invention increase the number of address ports (for example, to 8), since such an increase has a significant computational advantage, for example, a four to eight-fold increase in retrieving multi-dimensional data as compared with the data structure of FIG. 2. In one example, some data structures may provide the same computational advantage by further increasing the number of address ports. For example, a standard data array of FIG. 2 may be provided where each individual data element has its own address port. In such embodiments, a processor may directly access each correlated data element at its individual address in a single computational cycle. However, such embodiments use a greater number of address ports (for example, 4,096 address ports for a 64×64 sub-array) than the (8) address port used according to embodiments of the invention. Accordingly, embodiments of the invention provide a distinct advantage over such data structures by decreasing the processor overhead to achieve the same computational advantage.

It may be appreciated that although bursts are described as sequential entries arranged in a single row, bursts may alternatively be sequential entries in a single column, across multiple rows. In such an embodiment, a processor may transform the (4) vertically adjacent columns of a correlated (4×4) sub-array to different respective data arrays where the columns are horizontally staggered. In one embodiment, each data array may have at most one column with the correlated data elements from the same sub-array. Accordingly, a complete set of correlated data elements may be retrieved in a single cycle by simultaneously accessing a single column with correlated elements from each individually addressable data array.

Unlike the data elements transformed from data array 200 of FIG. 2, each of which corresponds to a pixel in an image, the null data elements described herein typically have no image information and are generally only used to organize data the structure 300 of FIG. 3. For example, the null data elements may be a sequence of zeros or other predetermined values or markers, or alternatively, the null data coordinates may be empty. Alternatively, the null data elements may have image information, for example, indicating the number of a preceding image row or the end of an image row or image region.

Embodiments of the invention may include an article such as a computer or processor readable medium, or a computer or processor storage medium, such as for example a memory, a disk drive, or a USB flash memory, encoding, including or storing instructions which when executed by a processor or controller (for example, processor 1 of FIG. 1), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

What is claimed is:

1. A method for processing multi-dimensional data, the method comprising:
receiving a set of data elements arranged in a single rectangular data array having a single data port, representing a multi-dimensional pixel array, each data element representing a single pixel;
storing the set of data elements divided among a plurality of individually addressable data arrays having a plurality of address ports, wherein each of the plurality of individually addressable data arrays comprises at most a single row that stores data elements from a sub-set of the set of data elements representing a multi-dimensional sub-array of the multi-dimensional pixel array, wherein storing comprises:
transforming the set of data elements from the single rectangular data array to the plurality of individually addressable data arrays, wherein the data elements are transferred in the order in which the data elements are sequentially ordered in the single rectangular data array, one row at a time, in order of the sequence of rows, and divided among the first available row in each of the plurality of the individually addressable data arrays, in order of the plurality of individually addressable data arrays, after which the data elements are divided among the next available row in each of the plurality of individually addressable data arrays; and
inserting a sequence null data elements in between data elements transformed from different rows of the single rectangular data array to stagger data elements which were vertically aligned in the single rectangular data array into different ones of the plurality of data arrays;
simultaneously accessing the single row of each of the plurality of individually addressable data arrays by accessing separate address ports for each individually addressable data array to retrieve the complete sub-set of data elements in a single computational cycle;
executing one or more instructions on the sub-set of data elements; and
displaying a video or image processed by executing the one or more instructions on the sub-set of data elements.

2. The method of claim 1, wherein the rows of data elements that are vertically stacked in the single rectangular data array are vertically staggered into a different respective one of the plurality of individually addressable data arrays.

3. Currently Amended), The method of claim 1, wherein the addresses of the separate address ports of the individually addressable data arrays are ordered according to the order in which the data elements are to be transformed thereinto.

4. The method of claim 1, wherein transforming is executed by a mapping unit to map the data elements when they are loaded from the single rectangular data array and stored into the plurality of individually addressable data arrays.

5. A method for processing multi-dimensional data, the method comprising:
receiving a set of data elements arranged in a single rectangular data array having a single data port, representing a multi-dimensional pixel array, each data element representing a single pixel;
transforming the set of data elements from the single rectangular data array to a plurality of individually addressable data arrays
storing the set of data elements divided among the plurality of individually addressable data arrays having a plurality of address ports, wherein each of the plurality of individually addressable data arrays comprises at most a single row that stores data elements from a sub-set of the set of data elements representing a multi-dimensional sub-array of the multi-dimensional pixel array,
simultaneously accessing the single row of each of the plurality of individually addressable data arrays by accessing separate address ports for each individually addressable data array to retrieve the complete sub-set of data elements in a single computational cycle, wherein the data elements are retrieved from rows of the plurality of individually addressable data arrays, which are separated by a number of data elements equal to the number of data elements in a row of the single rectangular data array plus the number of null data elements inserted between rows thereof;
executing one or more instructions on the sub-set of data elements; and
displaying a video or image processed by executing the one or more instructions on the sub-set of data elements.

6. The method of claim 5, wherein the rows of data elements that are vertically stacked in the single rectangular data array are vertically staggered into a different respective one of the plurality of individually addressable data arrays.

7. The method of claim 5, wherein the addresses of the separate address ports of the individually addressable data arrays are ordered according to the order in which the data elements are to be transformed thereinto.

8. The method of claim 5, wherein transforming is executed by a mapping unit to map the data elements when they are loaded from the single rectangular data array and stored into the plurality of individually addressable data arrays.

9. The method of claim 1, wherein the data elements are simultaneously retrieved in a burst from each row of each of the plurality of data arrays.

10. A processor for processing multiple dimension data, the processor comprising:
a load/store unit to receive a set of data elements representing a multi-dimensional pixel array arranged in a rectangular data array having a single data port, each data element representing a single pixel, and to store the set of data elements divided among a plurality of individually addressable data arrays, wherein each of the plurality of individually addressable data arrays comprises at most a single row that stores data elements from a sub-set of the set of data elements representing a multi-dimensional sub-array of the pixel array,
wherein the processor is to simultaneously access the single row of each of the plurality of individually addressable data arrays by accessing separate address ports for each individually addressable data array to retrieve the complete sub-set of data elements in a single computational cycle, wherein the data elements are retrieved from rows of the plurality of individually addressable data arrays, which are separated by a number of data elements equal to the number of data elements in a row of the single rectangular data array plus the number of null data elements inserted between rows the plurality of individually addressable data arrays; and
an execution unit to execute one or more instructions on the sub-set of data elements.

11. The processor of claim 10, wherein the load/store unit is to transform the set of data elements from a single rectangular data array having a single data port to the plurality of data arrays having a plurality of address ports.

12. The processor of claim 10, wherein the load/store unit is to store a string of data elements from the single rectangular data array, which are sequentially ordered from each row, one row at a time, in order of the sequence of rows, among the first available row across all of the plurality of data arrays, in order of the plurality of data arrays, after which the load/store unit stores data elements among the next available row in the plurality of data arrays.

13. The processor of claim 10, wherein the load/store unit is to transform rows of data elements that are vertically stacked in the single rectangular data array to be vertically staggered into a different respective one of the plurality of data arrays.

14. The processor of claim 10, wherein the processor simultaneously retrieves the complete sub-set of data elements in a burst from each row of each of the plurality of data arrays.

15. A system for processing multiple dimension data, the processor comprising:
   a single rectangular data array having a single data port storing a set of data elements representing a multi-dimensional pixel array, each data element representing a single pixel;
   a load/store unit to receive the set of data elements and store the set of data elements divided among a plurality of individually addressable data arrays each having a separate one of a plurality of address ports, wherein each of the plurality of individually addressable data arrays comprises at most a single row that stores data elements from a sub-set of the set of data elements representing a multi-dimensional sub-array of the pixel array,
   a processor to simultaneously access the single row of each of the plurality of individually addressable data arrays by accessing the corresponding respective address ports for each individually addressable data array to retrieve the complete sub-set of data elements in a single computational cycle, wherein the data elements are retrieved from rows of the plurality of individually addressable data arrays, which are separated by a number of data elements equal to the number of data elements in a row of the single rectangular data array plus the number of null data elements inserted between rows the plurality of individually addressable data arrays; and
   an execution unit to execute one or more instructions on the sub-set of data elements.

16. The system of claim 15, wherein the load/store unit is to transform the set of data elements from the single rectangular data array to the plurality of individually addressable data arrays.

17. The system of claim 15, wherein the load/store unit is to store a string of data elements from the single rectangular data array, which are sequentially ordered from each row, one row at a time, in order of the sequence of rows, among the first available row across all of the plurality of data arrays, in order of the plurality of individually addressable data arrays, after which the load/store unit stores data elements among the next available row in the plurality of individually addressable data arrays.

18. The system of claim 15, wherein the load/store unit is to transform rows of data elements that are vertically stacked in the single rectangular data array to be vertically staggered into a different respective one of the plurality of individually addressable data arrays.

19. The system of claim 15, wherein the processor simultaneously retrieves the complete sub-set of data elements in a burst from each row of each of the plurality of individually addressable data arrays.

20. The system of claim 15, comprising a mapping unit to transform the data elements when they are loaded from the single rectangular data array and stored into the plurality of individually addressable data arrays.

* * * * *